US012665643B2

(12) United States Patent (10) Patent No.: US 12,665,643 B2
Li et al. (45) Date of Patent: Jun. 23, 2026

(54) TIME DOMAIN RESTRICTION FOR CHANNEL STATE INFORMATION REFERENCE SIGNAL CONFIGURATION

(71) Applicant: INTEL CORPORATION, Santa Clara, CA (US)

(72) Inventors: Hua Li, Beijing (CN); Meng Zhang, Beijing (CN); Andrey Chervyakov, Maynooth (IE); Rui Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 261 days.

(21) Appl. No.: 18/553,279

(22) PCT Filed: May 10, 2022

(86) PCT No.: PCT/US2022/028551
§ 371 (c)(1),
(2) Date: Sep. 29, 2023

(87) PCT Pub. No.: WO2022/240850
PCT Pub. Date: Nov. 17, 2022

(65) Prior Publication Data
US 2024/0187071 A1 Jun. 6, 2024

Related U.S. Application Data

(60) Provisional application No. 63/186,433, filed on May 10, 2021.

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04L 5/0082* (2013.01); *H04W 24/10* (2013.01)

(58) Field of Classification Search
CPC ..... H04B 7/0626; H04L 5/0082; H04W 24/10
See application file for complete search history.

(56) References Cited

U.S. PATENT DOCUMENTS

| | | | | |
|---|---|---|---|---|
| 10,932,147 B2 * | 2/2021 | Huang | .................. | H04W 24/10 |
| 11,764,851 B2 * | 9/2023 | Islam | .................. | H04W 76/19 |
| | | | | 370/329 |

(Continued)

OTHER PUBLICATIONS

Notice of Reasons for Refusal issued Nov. 5, 2024 in Japanese Application No. 2023-552345, 4 pages.

(Continued)

*Primary Examiner* — Deepa Belur
(74) *Attorney, Agent, or Firm* — Gray Ice Higdon, PLLC

(57) ABSTRACT

This disclosure describes systems, methods, and devices related to channel state information reference signal (CSI-RS) configuration. A device may establish a first measurement window for a first CSI-RS associated with a first type of measurement in a measurement object (MO). The device may identify a measurement gap associated a second type of measurement. The device may perform adjustment to avoid a collision between the first measurement window and the measurement gap. The device may detect the first CSI-RS within the first measurement window.

18 Claims, 9 Drawing Sheets

(56)　　　　　　References Cited

U.S. PATENT DOCUMENTS

| | | | |
|---|---|---|---|
| 2019/0253906 A1* | 8/2019 | Lin | H04W 24/10 |
| 2019/0306734 A1 | 10/2019 | Huang et al. | |
| 2021/0050902 A1 | 2/2021 | Islam et al. | |
| 2022/0312236 A1* | 9/2022 | Tang | H04L 5/0048 |
| 2023/0023237 A1* | 1/2023 | Han | H04W 24/08 |
| 2023/0170965 A1* | 6/2023 | Cui | H04B 7/0652 |
| | | | 370/252 |
| 2025/0080201 A1* | 3/2025 | Yokokawa | H04B 7/088 |

OTHER PUBLICATIONS

"Remaining issues on CSI-RS L3 measurement core requirements." 3GPP TSG RAN WG4 Meeting #98-bis-e, Apr. 12-20, 2020, 7 pages.

"3rd Generation Partnership Project; Technical Specification Group Radio Access Network; NR; Requirements for support of radio resource management." 3GPP TS 38.133 V17.1.0, Mar. 2021, 5 pages.

International Search Report and Written Opinion of the International Searching Authority issued Aug. 23, 2022 for corresponding PCT International Application No. PCT/US2022/028551 (9 pp).

Vivo, "Remaining issues on CSI-RS L3 measurement core requirements," R4-2106614, 3GPP TSG RAN WG4 Meeting #98-bis-e, Electronic Meeting, Apr. 2, 2021 (Sections 1-2).

Intel Corporation, "Discussion about CSI-RS L3 measurement," R4-2106459, 3GPP TSG-RAN WG4 Meeting #98bis-e, Electronic Meeting, Apr. 2, 2021 (Section 2).

International Preliminary Report on Patentability mailed Nov. 23, 2023 in International Application No. PCT/US2022/028551, 8 pages.

* cited by examiner

CSI-RS resource 1

CSI-RS resource 2 time

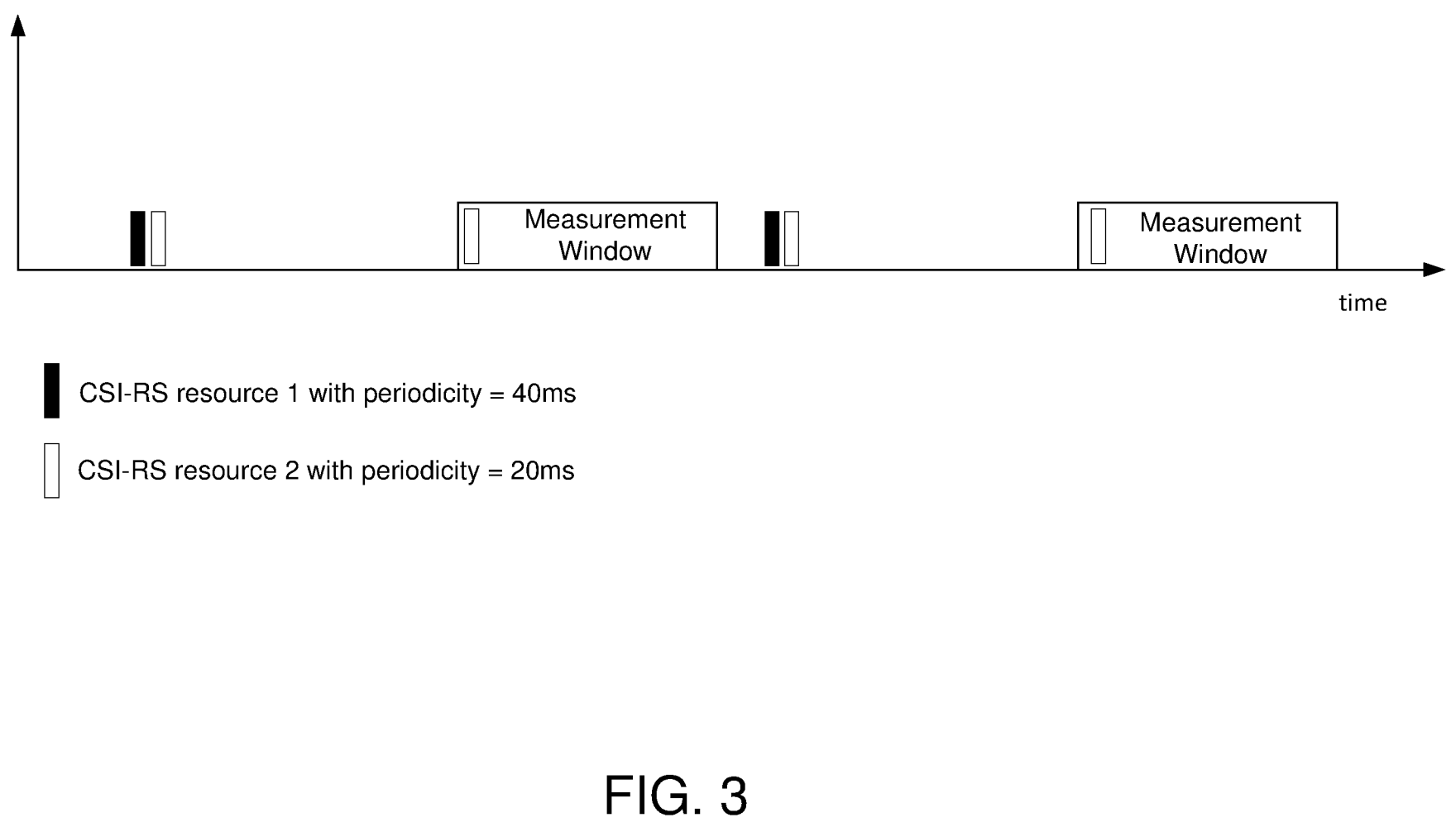

Measurement Window

Measurement Window

CSI-RS resource 1 with periodicity = 40ms

CSI-RS resource 2 with periodicity = 20ms

FIG. 3

CSI - RS resource1 with periodicity = 40 ms

CSI - RS resource2 with periodicity = 40 ms

600

ESTABLISH A FIRST MEASUREMENT WINDOW FOR A FIRST CSI-RS ASSOCIATED WITH A FIRST TYPE OF MEASUREMENT IN A MEASUREMENT OBJECT (MO) — 602

IDENTIFY A MEASUREMENT GAP ASSOCIATED A SECOND TYPE OF MEASUREMENT — 604

PERFORM ADJUSTMENT TO AVOID A COLLISION BETWEEN THE FIRST MEASUREMENT WINDOW AND THE MEASUREMENT GAP — 606

DETECT THE FIRST CSI-RS WITHIN THE FIRST MEASUREMENT WINDOW — 608

TIME DOMAIN RESTRICTION FOR CHANNEL STATE INFORMATION REFERENCE SIGNAL CONFIGURATION

CROSS-REFERENCE TO RELATED APPLICATION(S)

This application is a U.S. National Stage Application under 35 U.S.C. 371 and claims the priority benefit of International Application No. PCT/US2022/028551, filed May 10, 2022 and of U.S. Provisional Application No. 63/186,433, filed May 10, 2021, the disclosures of which are incorporated by reference as set forth in full.

TECHNICAL FIELD

This disclosure generally relates to systems and methods for wireless communications and, more particularly, to time domain restriction for channel state information reference signal configuration.

BACKGROUND

Wireless devices are becoming widely prevalent and are increasingly requesting access to wireless channels. Channel state information reference signal (CSI-RS) is a reference signal (RS) in 5G new radio (5G NR), to measure the characteristics of a radio channel.

BRIEF DESCRIPTION OF THE DRAWINGS

FIG. 3 depicts an illustrative schematic diagram for CSI-RS configuration, in accordance with one or more example embodiments of the present disclosure.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Channel state information reference signal (CSI-RS) is a reference signal (RS) in 5G new radio (5G NR), to measure the characteristics of a radio channel. UEs will use these reference signals to measure the quality of the radio channel and report this in the UL through the CQI Reports. A next generation radio access network (gNB) sends CSI Reference signals to report channel status information such as CSI-RSRP, CSI-RSRQ and CSI-SINR for mobility procedures. Specific instances of CSI reference signals can be configured for time/frequency tracking and mobility measurements.

In RAN4 #98bis, there is an open issue for time domain restriction for CSI-RS resource configuration. Whether all CSI-RS resources configured in the same measurement object (MO) are configured in the same 5 milliseconds (ms) window or different windows. However, there is no solution currently.

Various embodiments herein provide techniques for time domain restriction for CSI-RS resource configuration.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
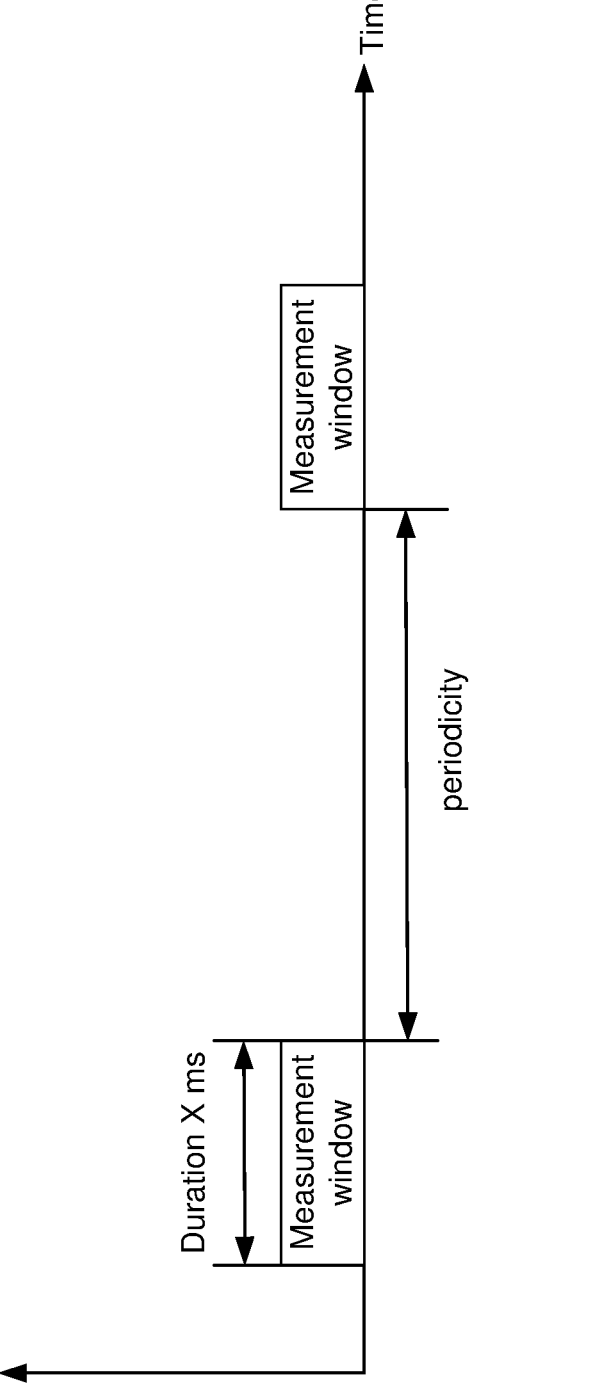
FIG. 1 depicts an illustrative schematic diagram for channel state information reference signal (CSI-RS) configuration, in accordance with one or more example embodiments of the present disclosure.

FIG. 1 depicts an illustrative schematic diagram for CSI-RS configuration, in accordance with one or more example embodiments of the present disclosure.

Referring to FIG. 1, there is shown a measurement window for CSI-RS measurement.

In a 5GS, there are time domain restrictions for CSI-RS resource configuration. For example, for CSI-RS L3 measurement, different from synchronization signal/PBCH block (SSB) based measurement, CSI-RS resource can be configured more dynamically.

If a UE is configured with the higher layer parameter CSI-RS-Resource-Mobility, the UE shall perform measurements based on CSI-RS-Resource-Mobility and the UE may base the timing of the CSI-RS resource on the timing of the serving cell.

The CSI-RS-Resource-Mobility is specified in 3GPP TS38.331, as follows:

```
CSI-RS-Resource-Mobility ::= SEQUENCE {
csi-RS-Index CSI-RS-Index,
slotConfig CHOICE {
ms4 INTEGER (0..31),
ms5 INTEGER (0..39),
ms10 INTEGER (0..79),
ms20 INTEGER (0..159),
ms40 INTEGER (0..319)
},
associatedSSB SEQUENCE {
ssb-Index SSB-Index,
isQuasiColocated BOOLEAN
} OPTIONAL, -- Need R
```

-continued

---

The CSI-RS-Resource-Mobility is specified
in 3GPP TS38.331, as follows:

---

```
frequencyDomainAllocation CHOICE {
row1 BIT STRING (SIZE (4)),
row2 BIT STRING (SIZE (12))
},
firstOFDMSymbolInTimeDomain INTEGER (0..13),
sequenceGenerationConfig INTEGER (0..1023),
...
}
```

---

As shown above, the periodic and timing offset can be configured differently for CSI-RS resources in one Measurement Object (MO).

In order to reduce the network (NW) and UE complexity, a measurement window for CSI-RS L3 measurement is needed. With the window, it will limit the UE CSI-RS L3 measurement location in the time domain. The window duration will be X ms and periodicity will be Y ms, where X and Y are positive integers.

In one or more embodiments, a measurement window for CSI-RS L3 measurement will be defined. The measurement window duration X and Y are configurable.

It is understood that the above descriptions are for purposes of illustration and are not meant to be limiting.

Figure 2:
FIG. 2 depicts an illustrative schematic diagram for CSI-RS configuration, in accordance with one or more example embodiments of the present disclosure.

FIG. 2 depicts an illustrative schematic diagram for CSI-RS configuration, in accordance with one or more example embodiments of the present disclosure.

Referring to FIG. 2, there is shown confliction between CSI-RS resource and measurement gap with different timing offset.

During a measurement window, due to limited time-frequency resource limitation, the number of CSI-RS resources will be limited.

For neighbor cell intra-frequency measurement, there are multiple cells. For each cell, there are multiple beams where each beam quality needs to be measured. Therefore, the total number of measurements will be large. There may be multiple CSI-RS resources configured in one MO. The supported maximum CSI-RS will depend on UE capability, as specified in 38.214:

A UE configured with the higher layer parameters CSI-RS-Resource-Mobility may expect to be configured;

With no more than 96 CSI-RS resources per higher layer parameter MeasObjectNR for UEs not supporting [increasedNumberofCSIRSPerMO-r16] when all CSI-RS resources configured by the same higher layer parameter MeasObjectNR have been configured with associatedSSB, or, With no more than 192 CSI-RS resources per higher layer parameter MeasObjectNR for UEs supporting [increasedNumberofCSIRSPerMO-r16] when all CSI-RS resources configured by the same higher layer parameter MeasObjectNR have been configured with associatedSSB, or, In one time window, it is possible that it cannot measure all the CSI-RS resources configured in one MO. Therefore, it needs to consider defining multiple windows for one MO. The benefit is that this allow flexible CSI-RS configuration. Considering CSI-RS resources may need to be placed in the same window as SSB, it may be difficult to accommodate all CSI-RS resources in a single window. Instead, NW may configure a larger resource periodicity and distribute CSI-RS resources to multiple windows.

Multiple CSI-RS L3 measurement windows may be configured for one MO. However, there will be some other scenarios where measurement gap will be used, e.g. SSB based inter-frequency measurement, positioning and so on. If CSI-RS resources are located at different windows, it's possible that some of the resources will conflict with these measurement gaps while some others may not. This is shown in FIG. 2.

Each CSI-RS resource will be a periodic signal, which has a configuration of periodicity and offset. In FIG. 2, the periodicity of CSI-RS resource 1 and CSI-RS resource 2 is the same, e.g. 20 ms. However, the timing offset of CSI-RS resource 1 and resource 2 are different. Suppose that 5 instances of CSI-RS will be needed for averaging and get CSI-RS measurement results. For CSI-RS resource 1, the measurement period is 20 ms*5=100 ms. For CSI-RS resource 2, it will fall into another measurement window and inside the window, there is a measurement gap, which will conflict with CSI-RS resource 2. Then the measurement period for CSI-RS resource 2 will be 20 ms*5*2=200 ms. Since the location of the measurement gap cannot be used, more measurement periods will be used. Therefore, the measurement period is different for CSI-RS resource 1 and 2, which make it impossible to define measurement requirement. Therefore, more conditions will be added for CSI-RS timing configuration, NW needs to make sure that no measurement gaps collide with all the CSI-RS resources. Otherwise, no requirement will apply.

In one or more embodiments, a CSI-RS configuration system may facilitate that if CSI-RS resources are configured in different timing windows, NW needs to make sure that no measurement gaps collide with all the CSI-RS resources. Otherwise, no requirement for CSI-RS measurement will apply.

It is understood that the above descriptions are for purposes of illustration and are not meant to be limiting.

FIG. 3 depicts an illustrative schematic diagram for CSI-RS configuration, in accordance with one or more example embodiments of the present disclosure.

Referring to FIG. 3, there is shown a conflict between CSI-RS resources and measurement gap with different periodicities.

In one or more embodiments, a CSI-RS configuration system may facilitate that if CSI-RS resources have different periodicity, it is also possible that some CSI-RS will fall into the measurement gap while some others will not, which are shown in FIG. 3.

Figure 4:
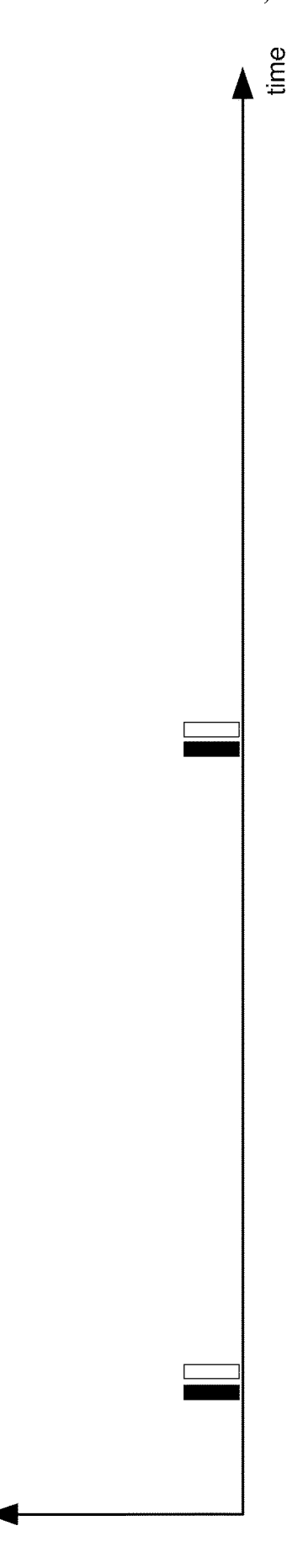
FIG. 4 depicts an illustrative schematic diagram for CSI-RS configuration, in accordance with one or more example embodiments of the present disclosure.

FIG. 4 depicts an illustrative schematic diagram for CSI-RS configuration, in accordance with one or more example embodiments of the present disclosure.

Referring to FIG. 4, there is shown CSI-RS resource periodicity in one MO. In FIG. 2, CSI-RS resource 2 with periodicity=20 ms, then in some cases it will fall into the measurement gap and sometimes will not. However, CSI-RS resource 1 will not collide with the measurement gap. Since CSI-RS 1 and CSI-RS 2 are configured in the same MO, it is difficult to define the requirement for this case since resources in the same MO will have different measurement periods. Therefore, it is preferred that all the CSI-RS resource will have the same periodicity. FIG. 4 shows that possible configuration.

In one or more embodiments, a CSI-RS configuration system may facilitate that all the CSI-RS resources in one MO will have the same periodicity.

In one or more embodiments, the CSI-RS periodicity can be configurable in one MO, e.g. 20 ms, 40 ms, and 80 ms.

Figure 5:
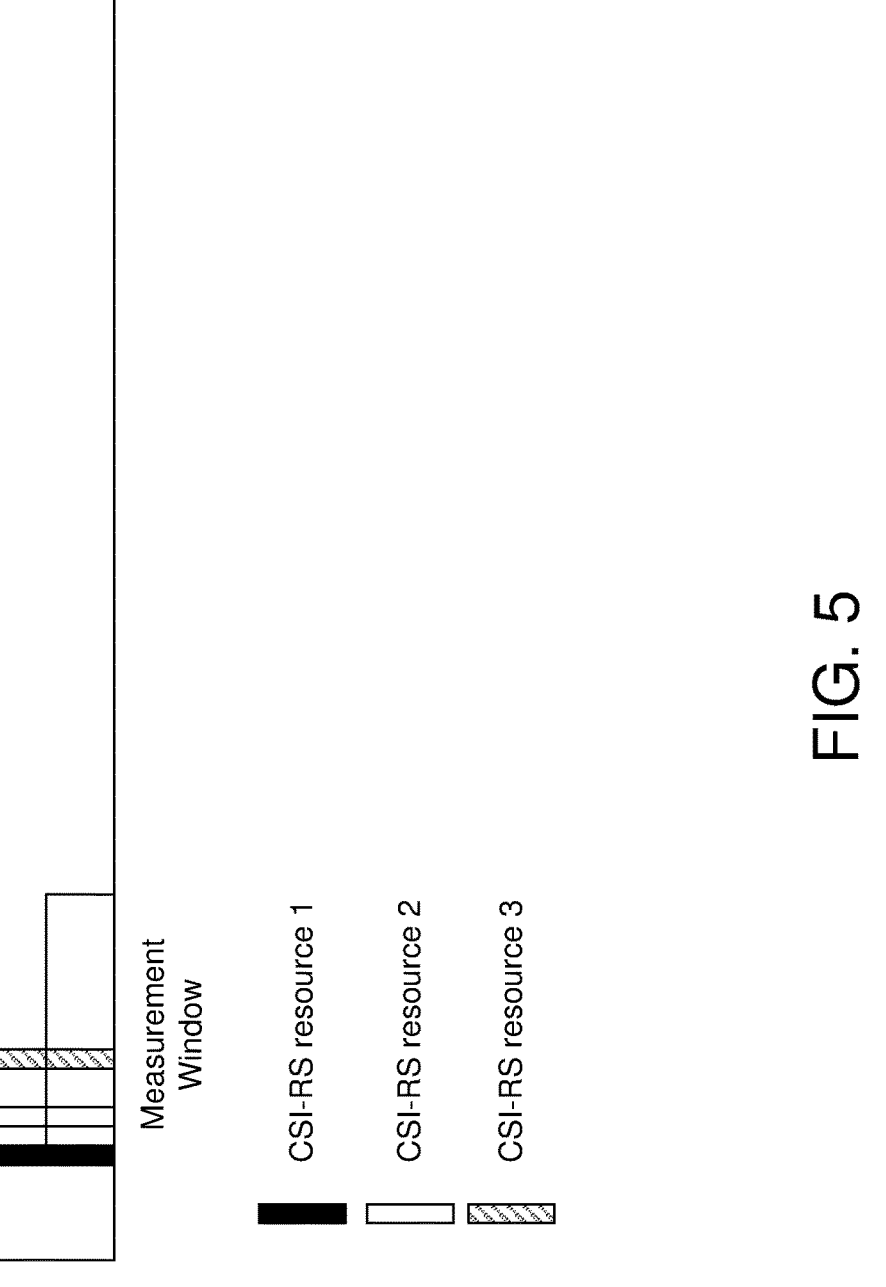
FIG. 5 depicts an illustrative schematic diagram for CSI-RS configuration, in accordance with one or more example embodiments of the present disclosure.

FIG. 5 depicts an illustrative schematic diagram for CSI-RS configuration, in accordance with one or more example embodiments of the present disclosure.

Referring to FIG. 5, there is shown a measurement window with a plurality of CSI-RS resources in the same MO.

There is a need to determine whether CSI-RS offset is the same or not in the same MO. As proposed above, CSI-RS resources can be configured in a different window with the same periodicity. Therefore, the CSI-RS resource offset can be different. If CSI-RS resources are configured in the same MO, the timing offset can be different either.

For the relation between CSI-RS offset and window starting point, there may be different timing offsets for multiple CSI-RS resources in the MO.

In one or more embodiments, NW can order these timing offsets of CSI-RS resources and make sure that the first configured L3 CSI-RS resource corresponds to the smallest offset.

In one or more embodiments, the window starting point corresponds to the smallest offset of the CSI-RS resource.

It is understood that the above descriptions are for purposes of illustration and are not meant to be limiting.

Figure 6:
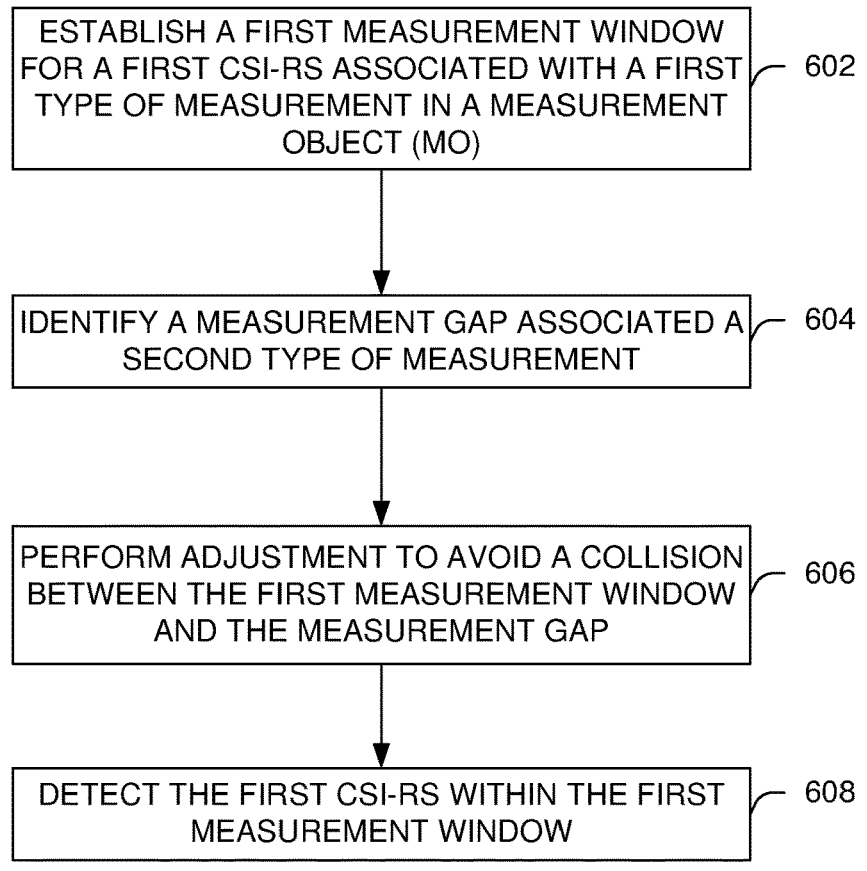
FIG. 6 illustrates a flow diagram of a process for an illustrative CSI-RS configuration system, in accordance with one or more example embodiments of the present disclosure.
Figure 7:
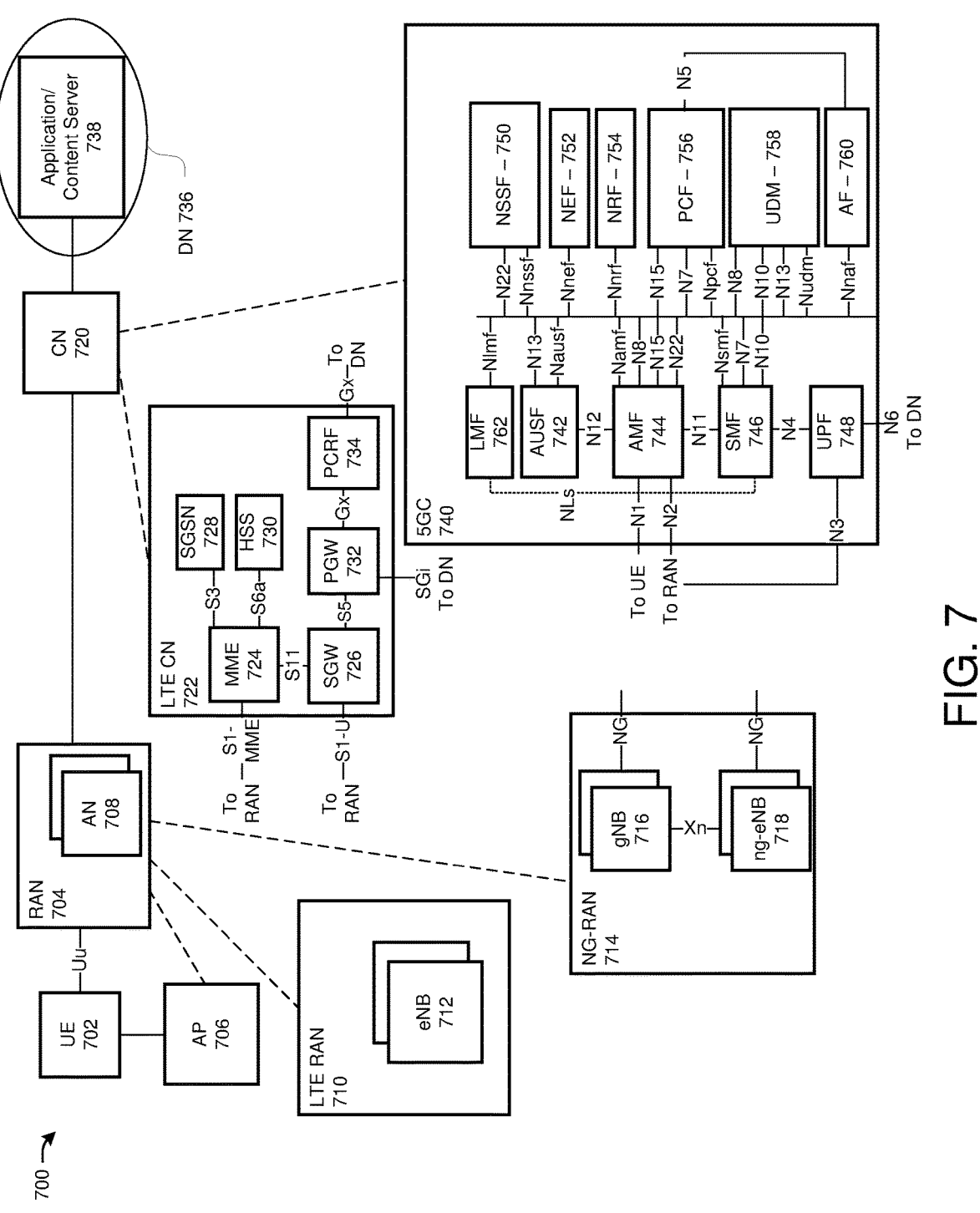
FIG. 7 illustrates an example network architecture, in accordance with one or more example embodiments of the present disclosure.
Figure 8:
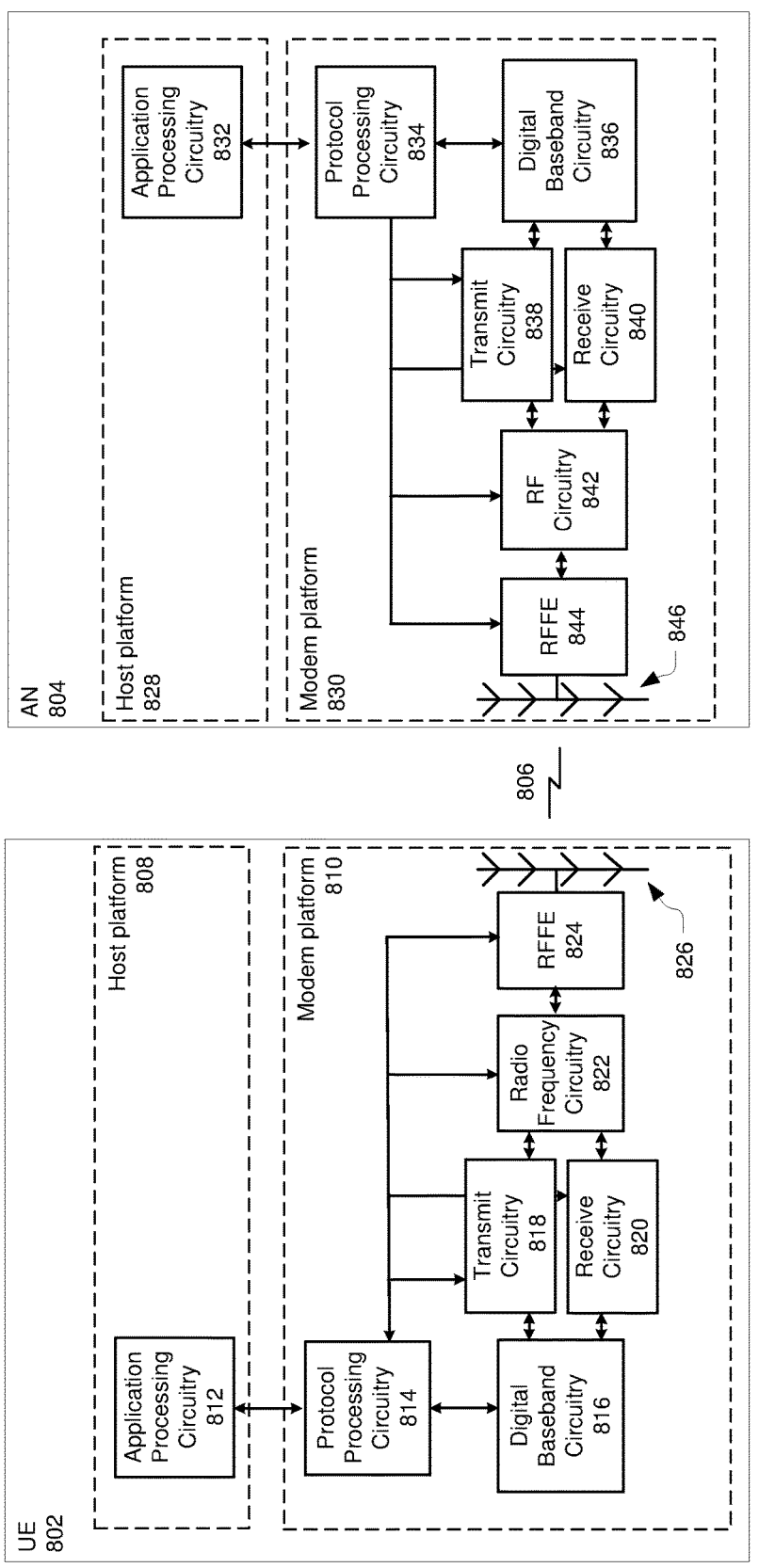
FIG. 8 schematically illustrates a wireless network, in accordance with one or more example embodiments of the present disclosure.
Figure 9:
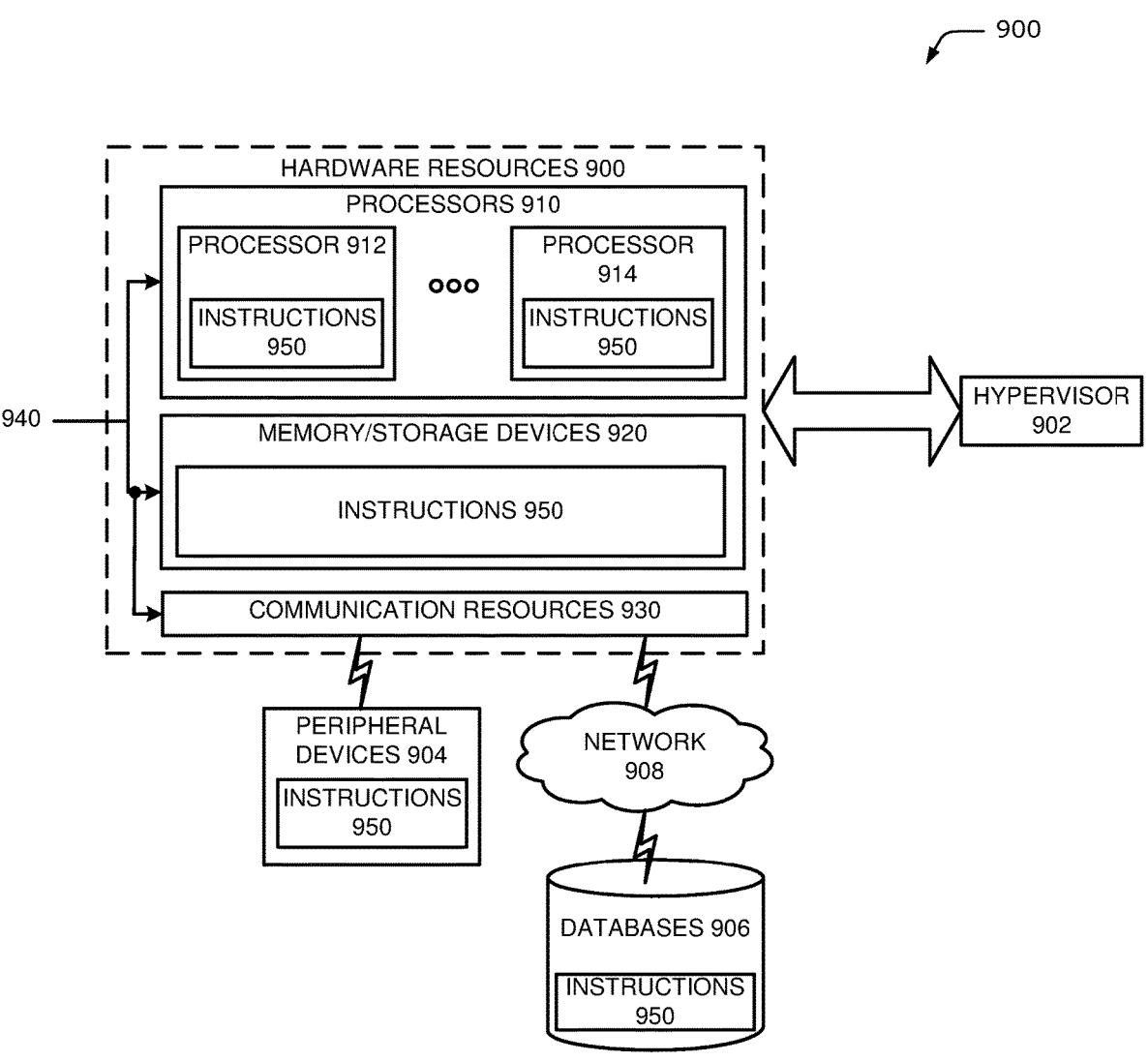
FIG. 9 illustrates components of a computing device, in accordance with one or more example embodiments of the present disclosure.

In some embodiments, the electronic device(s), network(s), system(s), chip(s) or component(s), or portions or implementations thereof, of FIGS. 7-9, or some other figure herein, may be configured to perform one or more processes, techniques, or methods as described herein, or portions thereof. One such process is depicted in FIG. 6.

For example, the process may include, at 602, establishing a first measurement window for a first CSI-RS associated with a first type of measurement in a measurement object (MO).

The process further includes, at 604, identifying a measurement gap associated a second type of measurement.

The process further includes, at 606, performing adjustment to avoid a collision between the first measurement window and the measurement gap.

The process further includes, at 608, detecting the first CSI-RS within the first measurement window.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

FIGS. 7-9 illustrate various systems, devices, and components that may implement aspects of disclosed embodiments.

FIG. 7 illustrates a network 700 in accordance with various embodiments. The network 700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 700 may include a UE 702, which may include any mobile or non-mobile computing device designed to communicate with a RAN 704 via an over-the-air connection. The UE 702 may be communicatively coupled with the RAN 704 by a Uu interface. The UE 702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 702 may additionally communicate with an AP 706 via an over-the-air connection. The AP 706 may manage a WLAN connection, which may serve to offload some/all network traffic from the RAN 704. The connection between the UE 702 and the AP 706 may be consistent with any IEEE 802.11 protocol, wherein the AP 706 could be a wireless fidelity (Wi-Fi®) router. In some embodiments, the UE 702, RAN 704, and AP 706 may utilize cellular-WLAN aggregation (for example, LWA/LWIP). Cellular-WLAN aggregation may involve the UE 702 being configured by the RAN 704 to utilize both cellular radio resources and WLAN resources.

The RAN 704 may include one or more access nodes, for example, AN 708. AN 708 may terminate air-interface protocols for the UE 702 by providing access stratum protocols including RRC, PDCP, RLC, MAC, and LI protocols. In this manner, the AN 708 may enable data/voice connectivity between CN 720 and the UE 702. In some embodiments, the AN 708 may be implemented in a discrete device or as one or more software entities running on server computers as part of, for example, a virtual network, which may be referred to as a CRAN or virtual baseband unit pool. The AN 708 be referred to as a BS, gNB, RAN node, eNB, ng-eNB, NodeB, RSU, TRxP, TRP, etc. The AN 708 may be a macrocell base station or a low power base station for providing femtocells, picocells or other like cells having smaller coverage areas, smaller user capacity, or higher bandwidth compared to macrocells.

In embodiments in which the RAN 704 includes a plurality of ANs, they may be coupled with one another via an X2 interface (if the RAN 704 is an LTE RAN) or an Xn interface (if the RAN 704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 704 may each manage one or more cells, cell groups, component carriers, etc. to provide the UE 702 with an air interface for network access. The UE 702 may be simultaneously connected with a plurality of cells provided by the same or different ANs of the RAN 704. For example, the UE 702 and RAN 704 may use carrier aggregation to allow the UE 702 to connect with a plurality of component carriers, each corresponding to a Pcell or Scell.

In dual connectivity scenarios, a first AN may be a master node that provides an MCG and a second AN may be secondary node that provides an SCG. The first/second ANs may be any combination of eNB, gNB, ng-eNB, etc.

The RAN 704 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 702 or AN 708 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 704 may be an LTE RAN 710 with eNBs, for example, eNB 712. The LTE RAN 710 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 704 may be an NG-RAN 714 with gNBs, for example, gNB 716, or ng-eNBs, for example, ng-eNB 718. The gNB 716 may connect with 5G-enabled UEs using a 5G NR interface. The gNB 716 may connect with a 5G core through an NG interface, which may include an N2 interface or an N3 interface. The ng-eNB 718 may also connect with the 5G core through an NG interface, but may connect with a UE via an LTE air interface. The gNB 716 and the ng-eNB 718 may connect with each other over an Xn interface.

In some embodiments, the NG interface may be split into two parts, an NG user plane (NG-U) interface, which carries traffic data between the nodes of the NG-RAN 714 and a UPF 748 (e.g., N3 interface), and an NG control plane (NG-C) interface, which is a signaling interface between the nodes of the NG-RAN 714 and an AMF 744 (e.g., N2 interface).

The NG-RAN 714 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 702 can be configured with multiple BWPs where each BWP configuration has a different SCS. When a BWP change is indicated to the UE 702, the SCS of the transmission is changed as well. Another use case example of BWP is related to power saving. In particular, multiple BWPs can be configured for the UE 702 with different amount of frequency resources (for example, PRBs) to support data transmission under different traffic loading scenarios. A BWP containing a smaller number of PRBs can be used for data transmission with small traffic load while allowing power saving at the UE 702 and in some cases at the gNB 716. A BWP containing a larger number of PRBs can be used for scenarios with higher traffic load.

The RAN 704 is communicatively coupled to CN 720 that includes network elements to provide various functions to support data and telecommunications services to customers/ subscribers (for example, users of UE 702). The components of the CN 720 may be implemented in one physical node or separate physical nodes. In some embodiments, NFV may be utilized to virtualize any or all of the functions provided by the network elements of the CN 720 onto physical compute/storage resources in servers, switches, etc. A logical instantiation of the CN 720 may be referred to as a network slice, and a logical instantiation of a portion of the CN 720 may be referred to as a network sub-slice.

In some embodiments, the CN 720 may be an LTE CN 722, which may also be referred to as an EPC. The LTE CN 722 may include MME 724, SGW 726, SGSN 728, HSS 730, PGW 732, and PCRF 734 coupled with one another over interfaces (or "reference points") as shown. Functions of the elements of the LTE CN 722 may be briefly introduced as follows.

The MME 724 may implement mobility management functions to track a current location of the UE 702 to facilitate paging, bearer activation/deactivation, handovers, gateway selection, authentication, etc.

The SGW 726 may terminate an S1 interface toward the RAN and route data packets between the RAN and the LTE CN 722. The SGW 726 may be a local mobility anchor point for inter-RAN node handovers and also may provide an anchor for inter-3GPP mobility. Other responsibilities may include lawful intercept, charging, and some policy enforcement.

The SGSN 728 may track a location of the UE 702 and perform security functions and access control. In addition, the SGSN 728 may perform inter-EPC node signaling for mobility between different RAT networks; PDN and S-GW selection as specified by MME 724; MME selection for handovers; etc. The S3 reference point between the MME 724 and the SGSN 728 may enable user and bearer information exchange for inter-3GPP access network mobility in idle/active states.

The HSS 730 may include a database for network users, including subscription-related information to support the network entities' handling of communication sessions. The HSS 730 can provide support for routing/roaming, authentication, authorization, naming/addressing resolution, location dependencies, etc. An S6a reference point between the HSS 730 and the MME 724 may enable transfer of subscription and authentication data for authenticating/authorizing user access to the LTE CN 720.

The PGW 732 may terminate an SGi interface toward a data network (DN) 736 that may include an application/content server 738. The PGW 732 may route data packets between the LTE CN 722 and the data network 736. The PGW 732 may be coupled with the SGW 726 by an S5 reference point to facilitate user plane tunneling and tunnel management. The PGW 732 may further include a node for policy enforcement and charging data collection (for example, PCEF). Additionally, the SGi reference point between the PGW 732 and the data network 7 36 may be an operator external public, a private PDN, or an intra-operator packet data network, for example, for provision of IMS services. The PGW 732 may be coupled with a PCRF 734 via a Gx reference point.

The PCRF 734 is the policy and charging control element of the LTE CN 722. The PCRF 734 may be communicatively coupled to the app/content server 738 to determine appropriate QoS and charging parameters for service flows. The PCRF 732 may provision associated rules into a PCEF (via Gx reference point) with appropriate TFT and QCI.

In some embodiments, the CN 720 may be a 5GC 740. The 5GC 740 may include an AUSF 742, AMF 744, SMF 746, UPF 748, NSSF 750, NEF 752, NRF 754, PCF 756, UDM 758, and AF 760 coupled with one another over interfaces (or "reference points") as shown. Functions of the elements of the 5GC 740 may be briefly introduced as follows.

The AUSF 742 may store data for authentication of UE 702 and handle authentication-related functionality. The AUSF 742 may facilitate a common authentication framework for various access types. In addition to communicating with other elements of the 5GC 740 over reference points as shown, the AUSF 742 may exhibit an Nausf service-based interface.

The AMF 744 may allow other functions of the 5GC 740 to communicate with the UE 702 and the RAN 704 and to subscribe to notifications about mobility events with respect to the UE 702. The AMF 744 may be responsible for registration management (for example, for registering UE 702), connection management, reachability management, mobility management, lawful interception of AMF-related events, and access authentication and authorization. The AMF 744 may provide transport for SM messages between the UE 702 and the SMF 746, and act as a transparent proxy for routing SM messages. AMF 744 may also provide transport for SMS messages between UE 702 and an SMSF. AMF 744 may interact with the AUSF 742 and the UE 702 to perform various security anchor and context management functions. Furthermore, AMF 744 may be a termination point of a RAN CP interface, which may include or be an N2 reference point between the RAN 704 and the AMF 744; and the AMF 744 may be a termination point of NAS (N1) signaling, and perform NAS ciphering and integrity protection. AMF 744 may also support NAS signaling with the UE 702 over an N3 IWF interface.

The SMF 746 may be responsible for SM (for example, session establishment, tunnel management between UPF 748 and AN 708); UE IP address allocation and management (including optional authorization); selection and control of UP function; configuring traffic steering at UPF 748 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 744 over N2 to AN 708; and determining SSC mode of a session. SM may refer to management of a PDU session, and a PDU session or "session" may refer to a PDU connectivity service that provides or enables the exchange of PDUs between the UE 702 and the data network 736.

The UPF 748 may act as an anchor point for intra-RAT and inter-RAT mobility, an external PDU session point of interconnect to data network 736, and a branching point to support multi-homed PDU session. The UPF 748 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 748 may include an uplink classifier to support routing traffic flows to a data network.

The NSSF 750 may select a set of network slice instances serving the UE 702. The NSSF 750 may also determine allowed NSSAI and the mapping to the subscribed S-NS-SAIs, if needed. The NSSF 750 may also determine the AMF set to be used to serve the UE 702, or a list of candidate AMFs based on a suitable configuration and possibly by querying the NRF 754. The selection of a set of network slice instances for the UE 702 may be triggered by the AMF 744 with which the UE 702 is registered by interacting with the NSSF 750, which may lead to a change of AMF. The NSSF 750 may interact with the AMF 744 via an N22 reference point; and may communicate with another NSSF in a visited network via an N31 reference point (not shown). Additionally, the NSSF 750 may exhibit an Nnssf service-based interface.

The NEF 752 may securely expose services and capabilities provided by 3GPP network functions for third party, internal exposure/re-exposure, AFs (e.g., AF 760), edge computing or fog computing systems, etc. In such embodiments, the NEF 752 may authenticate, authorize, or throttle the AFs. NEF 752 may also translate information exchanged with the AF 760 and information exchanged with internal network functions. For example, the NEF 752 may translate between an AF-Service-Identifier and an internal 5GC information. NEF 752 may also receive information from other NFs based on exposed capabilities of other NFs. This information may be stored at the NEF 752 as structured data, or at a data storage NF using standardized interfaces. The stored information can then be re-exposed by the NEF 752 to other NFs and AFs, or used for other purposes such as analytics. Additionally, the NEF 752 may exhibit an Nnef service-based interface.

The NRF 754 may support service discovery functions, receive NF discovery requests from NF instances, and provide the information of the discovered NF instances to the NF instances. NRF 754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 754 may exhibit the Nnrf service-based interface.

The PCF 756 may provide policy rules to control plane functions to enforce them, and may also support unified policy framework to govern network behavior. The PCF 756 may also implement a front end to access subscription information relevant for policy decisions in a UDR of the UDM 758. In addition to communicating with functions over reference points as shown, the PCF 756 exhibit an Npcf service-based interface.

The UDM 758 may handle subscription-related information to support the network entities' handling of communication sessions, and may store subscription data of UE 702. For example, subscription data may be communicated via an N8 reference point between the UDM 758 and the AMF 744. The UDM 758 may include two parts, an application front end and a UDR. The UDR may store subscription data and policy data for the UDM 758 and the PCF 756, and/or structured data for exposure and application data (including PFDs for application detection, application request information for multiple UEs 702) for the NEF 752. The Nudr service-based interface may be exhibited by the UDR 221 to allow the UDM 758, PCF 756, and NEF 752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 758 may exhibit the Nudm service-based interface.

The AF 760 may provide application influence on traffic routing, provide access to NEF, and interact with the policy framework for policy control.

In some embodiments, the 5GC 740 may enable edge computing by selecting operator/3rd party services to be geographically close to a point that the UE 702 is attached to the network. This may reduce latency and load on the network. To provide edge-computing implementations, the 5GC 740 may select a UPF 748 close to the UE 702 and execute traffic steering from the UPF 748 to data network 736 via the N6 interface. This may be based on the UE subscription data, UE location, and information provided by the AF 760. In this way, the AF 760 may influence UPF (re)selection and traffic routing. Based on operator deployment, when AF 760 is considered to be a trusted entity, the network operator may permit AF 760 to interact directly with relevant NFs. Additionally, the AF 760 may exhibit an Naf service-based interface.

The data network 736 may represent various network operator services, Internet access, or third party services that may be provided by one or more servers including, for example, application/content server 738.

FIG. 8 schematically illustrates a wireless network 800 in accordance with various embodiments. The wireless network 800 may include a UE 802 in wireless communication with an AN 804. The UE 802 and AN 804 may be similar to, and substantially interchangeable with, like-named components described elsewhere herein.

The UE 802 may be communicatively coupled with the AN 804 via connection 806. The connection 806 is illustrated as an air interface to enable communicative coupling, and can be consistent with cellular communications protocols such as an LTE protocol or a 5G NR protocol operating at mmWave or sub-6 GHZ frequencies.

The UE 802 may include a host platform 808 coupled with a modem platform 810. The host platform 808 may include application processing circuitry 812, which may be coupled with protocol processing circuitry 814 of the modem platform 810. The application processing circuitry 812 may run various applications for the UE 802 that source/sink application data. The application processing circuitry 812 may further implement one or more layer operations to transmit/receive application data to/from a data network. These layer operations may include transport (for example UDP) and Internet (for example, IP) operations.

The protocol processing circuitry 814 may implement one or more of layer operations to facilitate transmission or reception of data over the connection 806. The layer operations implemented by the protocol processing circuitry 814 may include, for example, MAC, RLC, PDCP, RRC and NAS operations.

The modem platform 810 may further include digital baseband circuitry 816 that may implement one or more layer operations that are "below" layer operations performed by the protocol processing circuitry 814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 810 may further include transmit circuitry 818, receive circuitry 820, RF circuitry 822, and RF front end (RFFE) 824, which may include or connect to one or more antenna panels 826. Briefly, the transmit circuitry 818 may include a digital-to-analog converter, mixer, intermediate frequency (IF) components, etc.; the receive circuitry 820 may include an analog-to-digital converter, mixer, IF components, etc.; the RF circuitry 822 may include a low-noise amplifier, a power amplifier, power tracking components, etc.; RFFE 824 may include filters (for example, surface/bulk acoustic wave filters), switches, antenna tuners, beamforming components (for example, phase-array antenna components), etc. The selection and arrangement of the components of the transmit circuitry 818, receive circuitry 820, RF circuitry 822, RFFE 824, and antenna panels 826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 814 may include one or more instances of control circuitry (not shown) to provide control functions for the transmit/receive components.

A UE reception may be established by and via the antenna panels 826, RFFE 824, RF circuitry 822, receive circuitry 820, digital baseband circuitry 816, and protocol processing circuitry 814. In some embodiments, the antenna panels 826 may receive a transmission from the AN 804 by receive-beamforming signals received by a plurality of antennas/ antenna elements of the one or more antenna panels 826.

A UE transmission may be established by and via the protocol processing circuitry 814, digital baseband circuitry 816, transmit circuitry 818, RF circuitry 822, RFFE 824, and antenna panels 826. In some embodiments, the transmit components of the UE 804 may apply a spatial filter to the data to be transmitted to form a transmit beam emitted by the antenna elements of the antenna panels 826.

Similar to the UE 802, the AN 804 may include a host platform 828 coupled with a modem platform 830. The host platform 828 may include application processing circuitry 832 coupled with protocol processing circuitry 834 of the modem platform 830. The modem platform may further include digital baseband circuitry 836, transmit circuitry 838, receive circuitry 840, RF circuitry 842, RFFE circuitry 844, and antenna panels 846. The components of the AN 804 may be similar to and substantially interchangeable with like-named components of the UE 802. In addition to performing data transmission/reception as described above, the components of the AN 808 may perform various logical functions that include, for example, RNC functions such as radio bearer management, uplink and downlink dynamic radio resource management, and data packet scheduling.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940 or other interface circuitry. For embodiments where node virtualization (e.g., NFV) is utilized, a hypervisor 902 may be executed to provide an execution environment for one or more network slices/sub- slices to utilize the hardware resources 900.

The processors 910 may include, for example, a processor 912 and a processor 914. The processors 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile, non-volatile, or semi-volatile memory such as dynamic random access memory (DRAM), static random access memory (SRAM), erasable program- mable read-only memory (EPROM), electrically erasable programmable read-only memory (EEPROM), Flash memory, solid-state storage, etc.

The communication resources 930 may include intercon- nection or network interface controllers, components, or other suitable devices to communicate with one or more peripheral devices 904 or one or more databases 906 or other network elements via a network 908. For example, the communication resources 930 may include wired commu- nication components (e.g., for coupling via USB, Ethernet, etc.), cellular communication components, NFC components, Bluetooth® (or Bluetooth® Low Energy) compo- nents, Wi-Fi® components, and other communication com- ponents.

Instructions 950 may comprise software, a program, an application, an applet, an app, or other executable code for causing at least any of the processors 910 to perform any one or more of the methodologies discussed herein. The instruc- tions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the com- ponents set forth in one or more of the preceding figures may be configured to perform one or more operations, tech- niques, processes, and/or methods as set forth in the example section below. For example, the baseband circuitry as described above in connection with one or more of the preceding figures may be configured to operate in accor- dance with one or more of the examples set forth below. For another example, circuitry associated with a UE, base sta- tion, network element, etc. as described above in connection with one or more of the preceding figures may be configured to operate in accordance with one or more of the examples set forth below in the example section.

Additional examples of the presently described embodi- ments include the following, non-limiting implementations. Each of the following non-limiting examples may stand on its own or may be combined in any permutation or combi- nation with any one or more of the other examples provided below or throughout the present disclosure.

For one or more embodiments, at least one of the com- ponents set forth in one or more of the preceding figures may be configured to perform one or more operations, tech- niques, processes, and/or methods as set forth in the example section below. For example, the baseband circuitry as described above in connection with one or more of the preceding figures may be configured to operate in accor- dance with one or more of the examples set forth below. For another example, circuitry associated with a UE, base sta- tion, network element, etc. as described above in connection with one or more of the preceding figures may be configured to operate in accordance with one or more of the examples set forth below.

The following examples pertain to further embodiments.

Example 1 may include a device comprising processing circuitry coupled to storage, the processing circuitry con- figured to: establish a first measurement window for a first channel state information reference signal (CSI-RS) associ- ated with a first type of measurement in a measurement object (MO); identify a measurement gap associated a second type of measurement; perform adjustment to avoid a collision between the first measurement window and the measurement gap; and detect the first CSI-RS within the first measurement window.

Example 2 may include the device of example 1 and/or some other example herein, wherein the first measurement window has a first duration that may be configurable.

Example 3 may include the device of example 1 and/or some other example herein, wherein the first measurement window has a first periodicity that may be configurable.

Example 4 may include the device of example 1 and/or some other example herein, wherein multiple CSI-RS measurement windows are configured for one MO.

Example 5 may include the device of example 1 and/or some other example herein, wherein the processing circuitry may be further configured to: define a second CSI-RS associated with the first type of measurement of the MO; and set the first CSI-RS and the second CSI-RS in the MO to have a CSI-RS periodicity that may be the same for the first CSI-RS and the second CSI-RS.

Example 6 may include the device of example 5 and/or some other example herein, wherein the CSI-RS periodicity may be at least one of 20 milliseconds (ms), 40 ms, or 80 ms.

Example 7 may include the device of example 5 and/or some other example herein, wherein a first timing offset of the first CSI-RS may be different from a second timing offset of the second CSI-RS.

Example 8 may include the device of example 7 and/or some other example herein, wherein the first timing offset of the first CSI-RS may be configured before the second timing offset of the second CSI-RS.

Example 9 may include the device of example 7 and/or some other example herein, wherein the first timing offset of the first CSI-RS may be a smaller time offset than the second timing offset of the second CSI-RS.

Example 10 may include a computer-readable medium storing computer-executable instructions which when executed by one or more processors result in performing operations comprising: establishing a first measurement window for a first channel state information reference signal (CSI-RS) associated with a first type of measurement in a measurement object (MO); identifying a measurement gap associated a second type of measurement; performing adjustment to avoid a collision between the first measurement window and the measurement gap; and detecting the first CSI-RS within the first measurement window.

Example 11 may include the computer-readable medium of example 10 and/or some other example herein, wherein the first measurement window has a first duration that may be configurable.

Example 12 may include the computer-readable medium of example 10 and/or some other example herein, wherein the first measurement window has a first periodicity that may be configurable.

Example 13 may include the computer-readable medium of example 10 and/or some other example herein, wherein multiple CSI-RS measurement windows are configured for one MO.

Example 14 may include the computer-readable medium of example 10 and/or some other example herein, wherein the operations further comprise: define a second CSI-RS associated with the first type of measurement of the MO; and setting the first CSI-RS and the second CSI-RS in the MO to have a CSI-RS periodicity that may be the same for the first CSI-RS and the second CSI-RS.

Example 15 may include the computer-readable medium of example 14 and/or some other example herein, wherein the CSI-RS periodicity may be at least one of 20 milliseconds (ms), 40 ms, or 80 ms.

Example 16 may include the computer-readable medium of example 14 and/or some other example herein, wherein a first timing offset of the first CSI-RS may be different from a second timing offset of the second CSI-RS.

Example 17 may include the computer-readable medium of example 16 and/or some other example herein, wherein the first timing offset of the first CSI-RS may be configured before the second timing offset of the second CSI-RS.

Example 18 may include the computer-readable medium of example 16 and/or some other example herein, wherein the first timing offset of the first CSI-RS may be a smaller time offset than the second timing offset of the second CSI-RS.

Example 19 may include a method comprising: establishing, by one or more processors, by one or more processors, a first measurement window for a first channel state information reference signal (CSI-RS) associated with a first type of measurement in a measurement object (MO); identifying a measurement gap associated a second type of measurement; performing adjustment to avoid a collision between the first measurement window and the measurement gap; and detecting the first CSI-RS within the first measurement window.

Example 20 may include the method of example 19 and/or some other example herein, wherein the first measurement window has a first duration that may be configurable.

Example 21 may include the method of example 19 and/or some other example herein, wherein the first measurement window has a first periodicity that may be configurable.

Example 22 may include the method of example 19 and/or some other example herein, wherein multiple CSI-RS measurement windows are configured for one MO.

Example 23 may include the method of example 19 and/or some other example herein, further comprising: define a second CSI-RS associated with the first type of measurement of the MO; and setting the first CSI-RS and the second CSI-RS in the MO to have a CSI-RS periodicity that may be the same for the first CSI-RS and the second CSI-RS.

Example 24 may include the method of example 23 and/or some other example herein, wherein the CSI-RS periodicity may be at least one of 20 milliseconds (ms), 40 ms, or 80 ms.

Example 25 may include the method of example 23 and/or some other example herein, wherein a first timing offset of the first CSI-RS may be different from a second timing offset of the second CSI-RS.

Example 26 may include the method of example 25 and/or some other example herein, wherein the first timing offset of the first CSI-RS may be configured before the second timing offset of the second CSI-RS.

Example 27 may include the method of example 25 and/or some other example herein, wherein the first timing offset of the first CSI-RS may be a smaller time offset than the second timing offset of the second CSI-RS.

Example 28 may include an apparatus comprising means for: establishing a first measurement window for a first channel state information reference signal (CSI-RS) associated with a first type of measurement in a measurement object (MO); identifying a measurement gap associated a second type of measurement; performing adjustment to avoid a collision between the first measurement window and the measurement gap; and detecting the first CSI-RS within the first measurement window.

Example 29 may include the apparatus of example 28 and/or some other example herein, wherein the first measurement window has a first duration that may be configurable.

Example 30 may include the apparatus of example 28 and/or some other example herein, wherein the first measurement window has a first periodicity that may be configurable.

Example 31 may include the apparatus of example 28 and/or some other example herein, wherein multiple CSI-RS measurement windows are configured for one MO.

Example 32 may include the apparatus of example 28 and/or some other example herein, further comprising: define a second CSI-RS associated with the first type of measurement of the MO; and setting the first CSI-RS and the second CSI-RS in the MO to have a CSI-RS periodicity that may be the same for the first CSI-RS and the second CSI-RS.

Example 33 may include the apparatus of example 32 and/or some other example herein, wherein the CSI-RS periodicity may be at least one of 20 milliseconds (ms), 40 ms, or 80 ms.

Example 34 may include the apparatus of example 32 and/or some other example herein, wherein a first timing offset of the first CSI-RS may be different from a second timing offset of the second CSI-RS.

Example 35 may include the apparatus of example 34 and/or some other example herein, wherein the first timing offset of the first CSI-RS may be configured before the second timing offset of the second CSI-RS.

Example 36 may include the apparatus of example 34 and/or some other example herein, wherein the first timing offset of the first CSI-RS may be a smaller time offset than the second timing offset of the second CSI-RS.

Example 37 may include an apparatus comprising means for performing any of the methods of examples 1-36.

Example 38 may include a network node comprising a communication interface and processing circuitry connected thereto and configured to perform the methods of examples 1-36.

Example 39 may include an apparatus comprising means to perform one or more elements of a method described in or related to any of examples 1-36, or any other method or process described herein.

Example 40 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 41 may include an apparatus comprising logic, modules, or circuitry to perform one or more elements of a method described in or related to any of examples 1-36, or any other method or process described herein.

Example 42 may include a method, technique, or process as described in or related to any of examples 1-36, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 44 may include a signal as described in or related to any of examples 1-36, or portions or parts thereof.

Example 45 may include a datagram, packet, frame, segment, protocol data unit (PDU), or message as described in or related to any of examples 1-36, or portions or parts thereof, or otherwise described in the present disclosure.

Example 46 may include a signal encoded with data as described in or related to any of examples 1-36, or portions or parts thereof, or otherwise described in the present disclosure.

Example 47 may include a signal encoded with a datagram, packet, frame, segment, protocol data unit (PDU), or message as described in or related to any of examples 1-36, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 49 may include a computer program comprising instructions, wherein execution of the program by a processing element is to cause the processing element to carry out the method, techniques, or process as described in or related to any of examples 1-36, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

TABLE 1

| | | | Abbreviations: | | | |
|---|---|---|---|---|---|---|
| 3GPP | Third Generation Partnership Project | IBE | In-Band Emission | PUSCH | Physical Uplink Shared Channel |
| 4G | Fourth Generation | IEEE | Institute of Electrical and Electronics Engineers | QAM | Quadrature Amplitude Modulation |
| 5G | Fifth Generation | IEI | Information Element Identifier | QCI | QoS class of identifier |
| 5GC | 5G Core network | IEIDL | Information Element Identifier Data Length | QCL | Quasi co-location |
| AC | Application Client | IETF | Internet Engineering Task Force | QFI | QoS Flow ID, QoS Flow Identifier |
| ACK | Acknowledgement | IF | Infrastructure | QoS | Quality of Service |
| ACID | Application Client Identification | IM | Interference Measurement, Intermodulation, IP Multimedia | QPSK | Quadrature (Quaternary) Phase Shift Keying |
| AF | Application Function | IMC | IMS Credentials | QZSS | Quasi-Zenith Satellite System |
| AM | Acknowledged Mode | IMEI | International Mobile Equipment Identity | RA-RNTI | Random Access RNTI |
| AMBR | Aggregate Maximum Bit Rate | IMGI | International mobile group identity | RAB | Radio Access Bearer, Random Access Burst |
| AMF | Access and Mobility Management Function | IMPI | IP Multimedia Private Identity | RACH | Random Access Channel |
| AN | Access Network | IMPU | IP Multimedia PUblic identity | RADIUS | Remote Authentication Dial In User Service |
| ANR | Automatic Neighbour Relation | IMS | IP Multimedia Subsystem | RAN | Radio Access Network |
| AP | Application Protocol, Antenna Port, Access Point | IMSI | International Mobile Subscriber Identity | RAND | RANDom number (used for authentication) |
| API | Application Programming Interface | IoT | Internet of Things | RAR | Random Access Response |
| APN | Access Point Name | IP | Internet Protocol | RAT | Radio Access Technology |
| ARP | Allocation and Retention Priority | Ipsec | IP Security, Internet Protocol Security | RAU | Routing Area Update |
| ARQ | Automatic Repeat Request | IP-CAN | IP-Connectivity Access Network | RB | Resource block, Radio Bearer |
| AS | Access Stratum | IP-M | IP Multicast | RBG | Resource block group |
| ASP | Application Service Provider | IPv4 | Internet Protocol Version 4 | REG | Resource Element Group |
| ASN.1 | Abstract Syntax Notation One | IPv6 | Internet Protocol Version 6 | Rel | Release |
| AUSF | Authentication Server Function | IR | Infrared | REQ | REQuest |
| AWGN | Additive White Gaussian Noise | IS | In Sync | RF | Radio Frequency |
| BAP | Backhaul Adaptation Protocol | IRP | Integration Reference Point | RI | Rank Indicator |
| BCH | Broadcast Channel | ISDN | Integrated Services Digital Network | RIV | Resource indicator value |
| BER | Bit Error Ratio | ISIM | IM Services Identity Module | RL | Radio Link |
| BFD | Beam Failure Detection | ISO | International Organisation for Standardisation | RLC | Radio Link Control, Radio Link Control layer |
| BLER | Block Error Rate | ISP | Internet Service Provider | RLC AM | RLC Acknowledged Mode |

TABLE 1-continued

| | | | Abbreviations: | | |
|---|---|---|---|---|---|
| BPSK | Binary Phase Shift Keying | IWF | Interworking-Function | RLC UM | RLC Unacknowledged Mode |
| BRAS | Broadband Remote Access Server | I-WLAN | Interworking WLAN | RLF | Radio Link Failure |
| BSS | Business Support System | | Constraint length of the convolutional code, USIM Individual key | RLM | Radio Link Monitoring |
| BS | Base Station | kB | Kilobyte (1000 bytes) | RLM-RS | Reference Signal for RLM |
| BSR | Buffer Status Report | kbps | kilo-bits per second | RM | Registration Management |
| BW | Bandwidth | Kc | Ciphering key | RMC | Reference Measurement Channel |
| BWP | Bandwidth Part | Ki | Individual subscriber authentication key | RMSI | Remaining MSI, Remaining Minimum System Information |
| C-RNTI | Cell Radio Network Temporary Identity | KPI | Key Performance Indicator | RN | Relay Node |
| CA | Carrier Aggregation, Certification Authority | KQI | Key Quality Indicator | RNC | Radio Network Controller |
| CAPEX | CAPital Expenditure | KSI | Key Set Identifier | RNL | Radio Network Layer |
| CBRA | Contention Based Random Access | ksps | kilo-symbols per second | RNTI | Radio Network Temporary Identifier |
| CC | Component Carrier, Country Code, Cryptographic Checksum | KVM | Kernel Virtual Machine | ROHC | RObust Header Compression |
| CCA | Clear Channel Assessment | L1 | Layer 1 (physical layer) | RRC | Radio Resource Control, Radio Resource Control layer |
| CCE | Control Channel Element | L1-RSRP | Layer 1 reference signal received power | RRM | Radio Resource Management |
| CCCH | Common Control Channel | L2 | Layer 2 (data link layer) | RS | Reference Signal |
| CE | Coverage Enhancement | L3 | Layer 3 (network layer) | RSRP | Reference Signal Received Power |
| CDM | Content Delivery Network | LAA | Licensed Assisted Access | RSRQ | Reference Signal Received Quality |
| CDMA | Code-Division Multiple Access | LAN | Local Area Network | RSSI | Received Signal Strength Indicator |
| CFRA | Contention Free Random Access | LADN | Local Area Data Network | RSU | Road Side Unit |
| CG | Cell Group | LBT | Listen Before Talk | RSTD | Reference Signal Time difference |
| CGF | Charging Gateway Function | LCM | LifeCycle Management | RTP | Real Time Protocol |
| CHF | Charging Function | LCR | Low Chip Rate | RTS | Ready-To-Send |
| CI | Cell Identity | LCS | Location Services | RTT | Round Trip Time |
| CID | Cell-ID (e.g., positioning method) | LCID | Logical Channel ID | Rx | Reception, Receiving, Receiver |
| CIM | Common Information Model | LI | Layer Indicator | S1AP | S1 Application Protocol |
| CIR | Carrier to Interference Ratio | LLC | Logical Link Control, Low Layer Compatibility | S1-MME | S1 for the control plane |
| CK | Cipher Key | LPLMN | Local PLMN | S1-U | S1 for the user plane |
| CM | Connection Management, Conditional Mandatory | LPP | LTE Positioning Protocol | S-GW | Serving Gateway |
| CMAS | Commercial Mobile Alert Service | LSB | Least Significant Bit | S-RNTI | SRNC Radio Network Temporary Identity |
| CMD | Command | LTE | Long Term Evolution | S-TMSI | SAE Temporary Mobile Station Identifier |
| CMS | Cloud Management System | LWA | LTE-WLAN aggregation | SA | Standalone operation mode |
| CO | Conditional Optional | LWIP | LTE/WLAN Radio Level Integration with IPsec Tunnel | SAE | System Architecture Evolution |
| CoMP | Coordinated Multi-Point | LTE | Long Term Evolution | SAP | Service Access Point |
| CORESET | Control Resource Set | M2M | Machine-to-Machine | SAPD | Service Access Point Descriptor |
| COTS | Commercial Off-The-Shelf | MAC | Medium Access Control (protocol layering context) | SAPI | Service Access Point Identifier |
| CP | Control Plane, Cyclic Prefix, Connection Point | MAC | Message authentication code (security/encryption context) | SCC | Secondary Component Carrier, Secondary CC |

TABLE 1-continued

| | | | | | |
|---|---|---|---|---|---|
| | | | Abbreviations: | | |
| CPD | Connection Point Descriptor | MAC-A | MAC used for authentication and key agreement (TSG T WG3 context) | SCell | Secondary Cell |
| CPE | Customer Premise Equipment | MAC-I | MAC used for data integrity of signalling messages (TSG T WG3 context) | SCEF | Service Capability Exposure Function |
| CPICH | Common Pilot Channel | MANO | Management and Orchestration | SC-FDMA | Single Carrier Frequency Division Multiple Access |
| CQI | Channel Quality Indicator | MBMS | Multimedia Broadcast and Multicast Service | SCG | Secondary Cell Group |
| CPU | CSI processing unit, Central Processing Unit | MBSFN | Multimedia Broadcast multicast service Single Frequency Network | SCM | Security Context Management |
| C/R | Command/Response field bit | MCC | Mobile Country Code | SCS | Subcarrier Spacing |
| CRAN | Cloud Radio Access Network, Cloud RAN | MCG | Master Cell Group | SCTP | Stream Control Transmission Protocol |
| CRB | Common Resource Block | MCOT | Maximum Channel Occupancy Time | SDAP | Service Data Adaptation Protocol, Service Data Adaptation Protocol layer |
| CRC | Cyclic Redundancy Check | MCS | Modulation and coding scheme | SDL | Supplementary Downlink |
| CRI | Channel-State Information Resource Indicator, CSI-RS Resource Indicator | MDAF | Management Data Analytics Function | SDNF | Structured Data Storage Network Function |
| C-RNTI | Cell RNTI | MDAS | Management Data Analytics Service | SDP | Session Description Protocol |
| CS | Circuit Switched | MDT | Minimization of Drive Tests | SDSF | Structured Data Storage Function |
| CSAR | Cloud Service Archive | ME | Mobile Equipment | SDU | Service Data Unit |
| CSI | Channel-State Information | MeNB | master eNB | SEAF | Security Anchor Function |
| CSI-IM | CSI Interference Measurement | MER | Message Error Ratio | SeNB | secondary eNB |
| CSI-RS | CSI Reference Signal | MGL | Measurement Gap Length | SEPP | Security Edge Protection Proxy |
| CSI-RSRP | CSI reference signal received power | MGRP | Measurement Gap Repetition Period | SFI | Slot format indication |
| CSI-RSRQ | CSI reference signal received quality | MIB | Master Information Block, Management Information Base | SFTD | Space-Frequency Time Diversity, SFN and frame timing difference |
| CSI-SINR | CSI signal-to-noise and interference ratio | MIMO | Multiple Input Multiple Output | SFN | System Frame Number |
| CSMA | Carrier Sense Multiple Access | MLC | Mobile Location Centre | SgNB | Secondary gNB |
| CSMA/CA | CSMA with collision avoidance | MM | Mobility Management | SGSN | Serving GPRS Support Node |
| CSS | Common Search Space, Cell-specific Search Space | MME | Mobility Management Entity | S-GW | Serving Gateway |
| CTF | Charging Trigger Function | MN | Master Node | SI | System Information |
| CTS | Clear-to-Send | MNO | Mobile Network Operator | SI-RNTI | System Information RNTI |
| CW | Codeword | MO | Measurement Object, Mobile Originated | SIB | System Information Block |
| CWS | Contention Window Size | MPBCH | MTC Physical Broadcast CHannel | SIM | Subscriber Identity Module |
| D2D | Device-to-Device | MPDCCH | MTC Physical Downlink Control CHannel | SIP | Session Initiated Protocol |
| DC | Dual Connectivity, Direct Current | MPDSCH | MTC Physical Downlink Shared CHannel | SiP | System in Package |
| DCI | Downlink Control Information | MPRACH | MTC Physical Random Access CHannel | SL | Sidelink |
| DF | Deployment Flavour | MPUSCH | MTC Physical Uplink Shared Channel | SLA | Service Level Agreement |
| DL | Downlink | MPLS | MultiProtocol Label Switching | SM | Session Management |
| DMTF | Distributed Management Task Force | MS | Mobile Station | SMF | Session Management Function |

TABLE 1-continued

| | | | | | | | | |
|---|---|---|---|---|---|---|---|
| | | Abbreviations: | | | | | |
| DPDK | Data Plane Development Kit | MSB | Most Significant Bit | SMS | Short Message Service |
| DM-RS, | DMRS Demodulation Reference Signal | MSC | Mobile Switching Centre | SMSF | SMS Function |
| DN | Data network | MSI | Minimum System Information, MCH Scheduling Information | SMTC | SSB-based Measurement Timing Configuration |
| DNN | Data Network Name | MSID | Mobile Station Identifier | SN | Secondary Node, Sequence Number |
| DNAI | Data Network Access Identifier | MSIN | Mobile Station Identification Number | SoC | System on Chip |
| DRB | Data Radio Bearer | MSISDN | Mobile Subscriber ISDN Number | SON | Self-Organizing Network |
| DRS | Discovery Reference Signal | MT | Mobile Terminated, Mobile Termination | SpCell | Special Cell |
| DRX | Discontinuous Reception | MTC | Machine-Type Communications | SP-CSI-RNTI | Semi-Persistent CSI RNTI |
| DSL | Domain Specific Language. Digital Subscriber Line | mMTC | massive MTC, massive Machine-Type Communications | SPS | Semi-Persistent Scheduling |
| DSLAM | DSL Access Multiplexer | MU-MIMO | Multi User MIMO | SQN | Sequence number |
| DwPTS | Downlink Pilot Time Slot | MWUS | MTC wake-up signal, MTC WUS | SR | Scheduling Request |
| E-LAN | Ethernet Local Area Network | NACK | Negative Acknowledgement | SRB | Signalling Radio Bearer |
| E2E | End-to-End | NAI | Network Access Identifier | SRS | Sounding Reference Signal |
| ECCA | extended clear channel assessment, extended CCA | NAS | Non-Access Stratum, Non-Access Stratum layer | SS | Synchronization Signal |
| ECCE | Enhanced Control Channel Element, Enhanced CCE | NCT | Network Connectivity Topology | SSB | Synchronization Signal Block |
| ED | Energy Detection | NC-JT | Non-Coherent Joint Transmission | SSID | Service Set Identifier |
| EDGE | Enhanced Datarates for GSM Evolution (GSM Evolution) | NEC | Network Capability Exposure | SS/PBCH | Block |
| EAS | Edge Application Server | NE-DC | NR-E-UTRA Dual Connectivity | SSBRI | SS/PBCH Block Resource Indicator, Synchronization Signal Block Resource Indicator |
| EASID | Edge Application Server Identification | NEF | Network Exposure Function | SSC | Session and Service Continuity |
| ECS | Edge Configuration Server | NF | Network Function | SS-RSRP | Synchronization Signal based Reference Signal Received Power |
| ECSP | Edge Computing Service Provider | NFP | Network Forwarding Path | SS-RSRQ | Synchronization Signal based Reference Signal Received Quality |
| EDN | Edge Data Network | NFPD | Network Forwarding Path Descriptor | SS-SINR | Synchronization Signal based Signal to Noise and Interference Ratio |
| EEC | Edge Enabler Client | NFV | Network Functions Virtualization | SSS | Secondary Synchronization Signal |
| EECID | Edge Enabler Client Identification | NFVI | NFV Infrastructure | SSSG | Search Space Set Group |
| EES | Edge Enabler Server | NFVO | NFV Orchestrator | SSSIF | Search Space Set Indicator |
| EESID | Edge Enabler Server Identification | NG | Next Generation, Next Gen | SST | Slice/Service Types |
| EHE | Edge Hosting Environment | NGEN-DC | NG-RAN E-UTRA-NR Dual Connectivity | SU-MIMO | Single User MIMO |
| EGMF | Exposure Governance tableManagement Function | NM | Network Manager | SUL | Supplementary Uplink |
| EGPRS | Enhanced GPRS | NMS | Network Management System | TA | Timing Advance, Tracking Area |
| EIR | Equipment Identity Register | N-PoP | Network Point of Presence | TAC | Tracking Area Code |
| eLAA | enhanced Licensed Assisted Access, enhanced LAA | NMIB, N-MIB | Narrowband MIB | TAG | Timing Advance Group |
| EM | Element Manager | NPBCH | Narrowband Physical Broadcast CHannel | TAI | Tracking Area Identity |

TABLE 1-continued

| | | | | | |
|---|---|---|---|---|---|
| | | | | Abbreviations: | |
| eMBB | Enhanced Mobile Broadband | NPDCCH | Narrowband Physical Downlink Control CHannel | TAU | Tracking Area Update |
| EMS | Element Management System | NPDSCH | Narrowband Physical Downlink Shared CHannel | TB | Transport Block |
| eNB | evolved NodeB, E-UTRAN Node B | NPRACH | Narrowband Physical Random Access CHannel | TBS | Transport Block Size |
| EN-DC | E-UTRA-NR Dual Connectivity | NPUSCH | Narrowband Physical Uplink Shared CHannel | TBD | To Be Defined |
| EPC | Evolved Packet Core | NPSS | Narrowband Primary Synchronization Signal | TCI | Transmission Configuration Indicator |
| EPDCCH | enhanced PDCCH, enhanced Physical Downlink Control Cannel | NSSS | Narrowband Secondary Synchronization Signal | TCP | Transmission Communication Protocol |
| EPRE | Energy per resource element | NR | New Radio, Neighbour Relation | TDD | Time Division Duplex |
| EPS | Evolved Packet System | NRF | NF Repository Function | TDM | Time Division Multiplexing |
| EREG | enhanced REG, enhanced resource element groups | NRS | Narrowband Reference Signal | TDMA | Time Division Multiple Access |
| ETSI | European Telecommunications Standards Institute | NS | Network Service | TE | Terminal Equipment |
| ETWS | Earthquake and Tsunami Warning System | NSA | Non-Standalone operation mode | TEID | Tunnel End Point Identifier |
| eUICC | embedded UICC, embedded Universal Integrated Circuit Card | NSD | Network Service Descriptor | TFT | Traffic Flow Template |
| E-UTRA | Evolved UTRA | NSR | Network Service Record | TMSI | Temporary Mobile Subscriber Identity |
| E-UTRAN | Evolved UTRAN | NSSAI | Network Slice Selection Assistance Information | TNL | Transport Network Layer |
| EV2X | Enhanced V2X | S-NNSAI | Single-NSSAI | TPC | Transmit Power Control |
| F1AP | F1 Application Protocol | NSSF | Network Slice Selection Function | TPMI | Tramsmitted Precoding Matrix Indicator |
| F1-C | F1 Control plane interface | NW | Network | TR | Technical Report |
| F1-U | F1 User plane interface | NWUS | Narrowband wake-up signal, Narrowband WUS | TRP, TRxP | Transmission Reception Point |
| FACCH | Fast Associated Control CHannel | NZP | Non-Zero Power | TRS | Tracking Reference Signal |
| FACCH/F | Fast Associated Control Channel/Full rate | O&M | Operation and Maintenance | TRx | Transceiver |
| FACCH/H | Fast Associated Control Channel/Half rate | ODU2 | Optical channel Data Unit - type 2 | TS | Technical Specifications, Technical Standard |
| FACH | Forward Access Channel | OFDM | Orthogonal Frequency Division Multiplexing | TTI | Transmission Time Interval |
| FAUSCH | Fast Uplink Signalling Channel | OFDMA | Orthogonal Frequency Division Multiple Access | Tx | Transmission, Transmitting, Transmitter |
| FB | Functional Block | OOB | Out-of-band | U-RNTI | UTRAN Radio Network Temporary Identity |
| FBI | Feedback Information | OOS | Out of Sync | UART | Universal Asynchronous Receiver and Transmitter |
| FCC | Federal Communications Commission | OPEX | OPerating EXpense | UCI | Uplink Control Information |
| FCCH | Frequency Correction CHannel | OSI | Other System Information | UE | User Equipment |
| FDD | Frequency Division Duplex | OSS | Operations Support System | UDM | Unified Data Management |
| FDM | Frequency Division Multiplex | OTA | over-the-air | UDP | User Datagram Protocol |
| FDMA | Frequency Division Multiple Access | PAPR | Peak-to-Average Power Ratio | UDSF | Unstructured Data Storage Network Function |
| FE | Front End | PAR | Peak to Average Ratio | UICC | Universal Integrated Circuit Card |
| FEC | Forward Error Correction | PBCH | Physical Broadcast Channel | UL | Uplink |

TABLE 1-continued

Abbreviations:

| | | | | | |
|---|---|---|---|---|---|
| FFS | For Further Study | PC | Power Control, Personal Computer | UM | Unacknowledged Mode |
| FFT | Fast Fourier Transformation | PCC | Primary Component Carrier, Primary CC | UML | Unified Modelling Language |
| feLAA | further enhanced Licensed Assisted Access, further enhanced LAA | PCell | Primary Cell | UMTS | Universal Mobile Telecommunications System |
| FN | Frame Number | PCI | Physical Cell ID, Physical Cell Identity | UP | User Plane |
| FPGA | Field-Programmable Gate Array | PCEF | Policy and Charging Enforcement Function | UPF | User Plane Function |
| FR | Frequency Range | PCF | Policy Control Function | URI | Uniform Resource Identifier |
| FQDN | Fully Qualified Domain Name | PCRF | Policy Control and Charging Rules Function | URL | Uniform Resource Locator |
| G-RNTI | GERAN Radio Network Temporary Identity | PDCP | Packet Data Convergence Protocol, Packet Data Convergence Protocol layer | URLLC | Ultra-Reliable and Low Latency |
| GERAN | GSM EDGE RAN, GSM EDGE Radio Access Network | PDCCH | Physical Downlink Control Channel | USB | Universal Serial Bus |
| GGSN | Gateway GPRS Support Node | PDCP | Packet Data Convergence Protocol | USIM | Universal Subscriber Identity Module |
| GLONASS | GLObal'naya NAvigatsionnaya Sputnikovaya Sistema (Engl.: Global Navigation Satellite System) | PDN | Packet Data Network, Public Data Network | USS | UE-specific search space |
| gNB | Next Generation NodeB | PDSCH | Physical Downlink Shared Channel | UTRA | UMTS Terrestrial Radio Access |
| gNB-CU | gNB-centralized unit, Next Generation NodeB centralized unit | PDU | Protocol Data Unit | UTRAN | Universal Terrestrial Radio Access Network |
| gNB-DU | gNB-distributed unit, Next Generation NodeB distributed unit | PEI | Permanent Equipment Identifiers | UwPTS | Uplink Pilot Time Slot |
| GNSS | Global Navigation Satellite System | PFD | Packet Flow Description | V2I | Vehicle-to-Infrastructure |
| GPRS | General Packet Radio Service | P-GW | PDN Gateway | V2P | Vehicle-to-Pedestrian |
| GPSI | Generic Public Subscription Identifier | PHICH | Physical hybrid-ARQ indicator channel | V2V | Vehicle-to-Vehicle |
| GSM | Global System for Mobile Communications, Groupe Special Mobile | PHY | Physical layer | V2X | Vehicle-to-everything |
| GTP | GPRS Tunneling Protocol | PLMN | Public Land Mobile Network | VIM | Virtualized Infrastructure Manager |
| GTP-U | GPRS Tunnelling Protocol for User Plane | PIN | Personal Identification Number | VL | Virtual Link, |
| GTS | Go To Sleep Signal (related to WUS) | PM | Performance Measurement | VLAN | Virtual LAN, Virtual Local Area Network |
| GUMMEI | Globally Unique MME Identifier | PMI | Precoding Matrix Indicator | VM | Virtual Machine |
| GUTI | Globally Unique Temporary UE Identity | PNF | Physical Network Function | VNF | Virtualized Network Function |
| HARQ | Hybrid ARQ, Hybrid Automatic Repeat Request | PNFD | Physical Network Function Descriptor | VNFFG | VNF Forwarding Graph |
| HANDO | Handover | PNFR | Physical Network Function Record | VNFFGD | VNF Forwarding Graph Descriptor |
| HFN | HyperFrame Number | POC | PTT over Cellular | VNFM | VNF Manager |
| HHO | Hard Handover | PP, PTP | Point-to-Point | VoIP | Voice-over-IP, Voice-over-Internet Protocol |
| HLR | Home Location Register | PPP | Point-to-Point Protocol | VPLMN | Visited Public Land Mobile Network |
| HN | Home Network | PRACH | Physical RACH | VPN | Virtual Private Network |
| HO | Handover | PRB | Physical resource block | VRB | Virtual Resource Block |
| HPLMN | Home Public Land Mobile Network | PRG | Physical resource block group | WiMAX | Worldwide Interoperability for Microwave Access |
| HSDPA | High Speed Downlink Packet Access | ProSe | Proximity Services, Proximity-Based Service | WLAN | Wireless Local Area Network |

TABLE 1-continued

Abbreviations:

| | | | | | | | |
|---|---|---|---|---|---|---|---|
| HSN | Hopping Sequence Number | PRS | Positioning Reference Signal | WMAN | Wireless Metropolitan Area Network | | |
| HSPA | High Speed Packet Access | PRR | Packet Reception Radio | WPAN | Wireless Personal Area Network | | |
| HSS | Home Subscriber Server | PS | Packet Services | X2-C | X2-Control plane | | |
| HSUPA | High Speed Uplink Packet Access | PSBCH | Physical Sidelink Broadcast Channel | X2-U | X2-User plane | | |
| HTTP | Hyper Text Transfer Protocol | PSDCH | Physical Sidelink Downlink Channel | XML | eXtensible Markup Language | | |
| HTTPS | Hyper Text Transfer Protocol Secure (https is http/1.1 over SSL, i.e. port 443) | PSCCH | Physical Sidelink Control Channel | XRES | EXpected user RESponse | | |
| I-Block | Information Block | PSSCH | Physical Sidelink Shared Channel | XOR | eXclusive OR | | |
| ICCID | Integrated Circuit Card Identification | PSCell | Primary SCell | ZC | Zadoff-Chu | | |
| IAB | Integrated Access and Backhaul | PSS | Primary Synchronization Signal | ZP | Zero Po | | |
| ICIC | Inter-Cell Interference Coordination | PSTN | Public Switched Telephone Network | | | | |
| ID | Identity, identifier | PT-RS | Phase-tracking reference signal | | | | |
| IDFT | Inverse Discrete Fourier Transform | PTT | Push-to-Talk | | | | |
| IE | Information element | PUCCH | Physical Uplink Control Channel | | | | |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information.

The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™, Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term "data element" or "element" as used herein refers to a unit that is indivisible at a given level of abstraction and has a clearly defined boundary. A data element is a logical component of an information object (e.g., electronic document) that may begin with a start tag (e.g., "<element>") and end with a matching end tag (e.g., "</element>"), or only has an empty element tag (e.g., "<element />"). Any characters between the start tag and end tag, if any, are the element's content (referred to herein as "content items" or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., "<element>content item</element>"), attributes (e.g., "<element attribute="attribute Value">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000

(CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWANT developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHZ and above such as WiGig, IEEE 802.1 lad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Syncrhonization Signal (PSS), a Secondary Syncrhonization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the near-RT RIC function, and hence the RAN, towards better fulfilment of the RAN intent.

The term "A1 Enrichment information" refers to information utilized by near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit-Control Plane" or "O-CU-CP" refers to a logical node hosting the RRC and the control plane part of the PDCP protocol.

The term "O-RAN Central Unit-User Plane" or "O-CU-UP" refers to a logical node hosting the user plane part of the PDCP protocol and the SDAP protocol The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of A1 policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the near-RT RIC setting up or updating Traffic Steering aware resource optimization procedure based on information from A1 Policy setup or update, A1 Enrichment Information (EI) and/or outcome of Near-RT RIC evaluation, which includes the initial configuration (preconditions) and injection of related A1 policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term "Traffic Steering Target" refers to the intended performance result that is desired from the network, which is configured to Near-RT RIC over O1.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C #, "C", Kotlin, Swift, Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

What is claimed is:

1. An apparatus for facilitating channel state information reference signal (CSI-RS) measurements, the apparatus comprising processing circuitry coupled to storage, the processing circuitry configured to:

identify a measurement gap (MG) during which a channel measurement is to be performed;

configure all CSI-RS resources for a measurement opportunity (MO) on one intra-frequency layer within up to two separate time windows each of up to 5 milliseconds that are either both fully non-overlapped with the MG or both partially overlapped with the measurement gap; and signal all the configured CSI-RS resources to a user equipment for performing CSI measurements during the MO.

2. The apparatus of claim 1, wherein the up to two separate time windows consist of two time windows.

3. The apparatus of claim 2, wherein the two time windows are each of 5 milliseconds.

4. The apparatus of claim 1, wherein a periodicity of all the configured CSI-RS resources is the same.

5. The apparatus of claim 4, wherein the periodicity is 20 milliseconds.

6. The apparatus of claim 1, wherein all the CSI-RS resources are fully non-overlapped with the MG.

7. A non-transitory computer-readable medium storing computer-executable instructions for facilitating channel state information reference signal (CSI-RS) measurements, which when executed by one or more processors result in performing operations comprising:

identifying a measurement gap (MG) during which a channel measurement is to be performed;

configuring all CSI-RS resources for a measurement opportunity (MO) on one intra-frequency layer within up to two separate time windows each of up to 5 milliseconds that are either both fully non-overlapped with the MG or both partially overlapped with the measurement gap; and signaling all the configured CSI-RS resources to a user equipment for performing CSI measurements during the MO.

8. The non-transitory computer-readable medium of claim 7, wherein the up to two separate time windows consist of two time windows.

9. The non-transitory computer-readable medium of claim 8, wherein the two time windows are each of 5 milliseconds.

10. The non-transitory computer-readable medium of claim 7, wherein a periodicity of all the configured CSI-RS resources is the same.

11. The non-transitory computer-readable medium of claim 10, wherein the periodicity is 20 milliseconds.

12. The non-transitory computer-readable medium of claim 7, wherein all the CSI-RS resources are fully non-overlapped with the MG.

13. A method for facilitating channel state information reference signal (CSI-RS) measurements, the method comprising:

identifying, by processing circuitry of a communications network, a measurement gap (MG) during which a channel measurement is to be performed;

configuring, by the processing circuitry, all CSI-RS resources for a measurement opportunity (MO) on one intra-frequency layer within up to two separate time windows each of up to 5 milliseconds that are either both fully non-overlapped with the MG or both partially overlapped with the measurement gap; and signaling, by the processing circuitry, all the configured CSI-RS resources to a user equipment for performing CSI measurements during the MO.

14. The method of claim 13, wherein the up to two separate time windows consist of two time windows.

15. The method of claim 14, wherein the two time windows are each of 5 milliseconds.

16. The method of claim 13, wherein a periodicity of all the configured CSI-RS resources is the same.

17. The method of claim 16, wherein the periodicity is 20 milliseconds.

18. The method of claim 13, wherein all the CSI-RS resources are fully non-overlapped with the MG.

\* \* \* \* \*